(12) United States Patent
Klok (10) Patent No.: US 10,198,936 B2
(45) Date of Patent: Feb. 5, 2019

(54) CONTROL OF ELECTRONIC COMPONENTS

(75) Inventor: Patrick Klok, Almelo (NL)

(73) Assignee: DISH Technologies L.L.C., Englewood, CO (US)

( * ) Notice: Subject to any disclaimer, the term of this patent is extended or adjusted under 35 U.S.C. 154(b) by 552 days.

(21) Appl. No.: 12/974,614

(22) Filed: Dec. 21, 2010

(65) Prior Publication Data

US 2011/0153032 A1 Jun. 23, 2011

(30) Foreign Application Priority Data

Dec. 22, 2009 (EP) .................................... 09180482

(51) Int. Cl.
*G08C 17/02* (2006.01)
*G06Q 10/06* (2012.01)

(52) U.S. Cl.
CPC ............. *G08C 17/02* (2013.01); *G06Q 10/06* (2013.01); *G08C 2201/41* (2013.01); *G08C 2201/42* (2013.01)

(58) Field of Classification Search
USPC ............................................ 370/419, 211.01
See application file for complete search history.

(56) References Cited

U.S. PATENT DOCUMENTS

| | | | | |
|---|---|---|---|---|
| 6,671,818 B1 * | 12/2003 | Mikurak | ................ | G06Q 10/06 714/4.21 |
| 6,678,740 B1 * | 1/2004 | Rakib | ............. | G08B 13/19656 348/E7.069 |
| 7,130,807 B1 * | 10/2006 | Mikurak | ................ | G06Q 10/06 705/7.25 |
| 7,305,278 B2 * | 12/2007 | Enright | .................. | G06Q 10/06 700/103 |
| 7,716,077 B1 * | 5/2010 | Mikurak | ................ | G06Q 10/06 705/7.12 |
| 8,165,707 B2 * | 4/2012 | Enright | .................. | G06Q 10/06 700/103 |

(Continued)

FOREIGN PATENT DOCUMENTS

| | | |
|---|---|---|
| WO | WO 02/0054676 | 7/2002 |
| WO | WO 06/0035472 | 4/2006 |
| WO | WO 07/0135695 | 11/2007 |

OTHER PUBLICATIONS

Examination Report dated Jul. 5, 2012, for corresponding European Patent Application No. 09180482.3, 7 pages.

(Continued)

*Primary Examiner* — Gregory B Sefcheck
(74) *Attorney, Agent, or Firm* — Seed Intellectual Property Law Group LLP (57) ABSTRACT

A central control box utilizes a receiving element configured to receive an input command, a processor configured to receive a first data signal from a first component, receive state information regarding a second component, and process the received input command based on the state information regarding the second component. The central control box further utilizes a transmitter configured to transmit the first data signal, and a storage device connected to the processor. The storage device is configured to store the state information regarding the second component. Other embodiments include a system and a method for routing a first data signal between a first component and a second component.

18 Claims, 5 Drawing Sheets

(56) References Cited

U.S. PATENT DOCUMENTS

| | | |
|---|---|---|
| 2006/0161635 A1* | 7/2006 | Lamkin et al. .............. 709/217 |
| 2007/0132733 A1* | 6/2007 | Ram ............................. 345/163 |
| 2008/0068152 A1 | 3/2008 | Igoe |
| 2008/0144797 A1* | 6/2008 | Spear ...................... 379/211.01 |
| 2008/0221715 A1* | 9/2008 | Krzyzanowski et al. ...... 700/90 |
| 2011/0090831 A1* | 4/2011 | Howard ....................... 370/311 |

OTHER PUBLICATIONS

Extended European Search Report dated Mar. 3, 2010, EP 09 180482.3, 7 pages.

* cited by examiner

CONTROL OF ELECTRONIC COMPONENTS

CROSS-REFERENCE TO RELATED APPLICATIONS

The present application claims the benefit under 35 U.S.C. § 119(b) to European Patent Application No. 09180482.3, which was filed on Dec. 22, 2009, in the European Patent Office, and entitled "A Method and System for Control of Electronic Components," which is incorporated by reference into the present application in its entirety.

FIELD OF THE INVENTION

This disclosure relates to control of electronic components, and more specifically to utilizing a centralized control unit to control various electronic components.

SUMMARY

The present invention relates to a centralized control unit. Generally, electronic components in a home, office or other locale may each be controlled by a remote control device configured to control one or multiple components. In embodiments, the present invention seeks to facilitate controlling various electronic components, including televisions and sound systems.

According to a first aspect of the present invention, there is provided a central control box includes a receiving element configured to receive an input command, a processor connected to the receiving element and configured to receive a first data signal from a first component, receive state information regarding a second component, and process the received input command based on the state information regarding the second component, a first transmitter connected to the processor and configured to transmit the first data signal; and a storage device connected to the processor and configured to store the state information regarding the second component. The central control box may be configured receive data signals and state information regarding any number of components.

In one example, the processor may further be configured to update the state information stored by the storage device regarding the second component. Further, in one example, the first component is located in a different room than the second component.

In another example, the first data signal is received from a first local control box connected to the first component and the state information is received from a second local control box connected to the second component.

In a further example, the central control box further includes a second transmitter connected to the processor and configured to transmit a control command to control a function of the first local control box.

In a variation, the first transmitter is configured to transmit the first data signal from the first local control box to the second local control box.

In one example, the state information regarding the second component includes whether the second component is available or unavailable to process the first data signal.

In another example, if the state information indicates that the second component is available to process the first data signal, the first transmitter transmits the first data signal from a first local control box connected to the first component to a second local control box connected to the second component.

In a further example, if the state information indicates that the second component is unavailable to process the first data signal, the first transmitter does not transmit the first data signal.

In one variation, the processor is configured to update the state information to indicate that the second component is unavailable to process the first data signal once the first data signal is transmitted from the first local control box to the second local control box.

In one example, the input command is received from a first local control box connected to the central control box.

According to another aspect of the present invention, there is provided a method for routing a first data signal between a first component and a second component, the method comprising receiving an input command identifying the first component and the second component, receiving a first data signal output by the first component, retrieving state information regarding the second component, and routing the first data signal through a central control box based on the state information regarding the second component.

In an example, the first data signal is routed from a first local control box connected to the first component to a second local control box connected to the second component. The first data signal may also not be routed through the central control box if the state information indicates that the second component is unavailable.

In one example, the method further comprises storing the state information regarding the second component in a storage device and updating the state information regarding the second component once the first data signal has been routed through the central control box.

According to a further aspect of the present invention, there is provided a system for routing a data signal between two or more components, comprising: a first control box configured to receive a first data signal from a first component, a second control box operably connected to the first control box, and a third control box operably connected to the second control box and to a second component, wherein the second control box is configured to transmit the first data signal from the first control box to the third control box, and the third control box is configured to relay the first data signal to the second component; and at least one of the first, second, and third control box is configured to receive and store state information regarding the second component.

In one example, the second control box is configured to transmit the first data signal to the second component based on the state information regarding the second component.

DETAILED DESCRIPTION OF THE EMBODIMENTS

Generally, embodiments described herein disclose systems, apparatuses and methods for controlling multiple components using a single, centralized device (referred to herein as a "control box"). The control box may be connected to various components in a home, office or other locale and configured to control these components. As an example, the control box may be configured to control various functions of the components and receive state information regarding the components. Thus, through the control box, a user may control the components connected thereto, as well as facilitate interaction between the components. This may be true even when the components are located in different rooms from one another and/or in different rooms from the control box.

The control box may also be configured to relay data, such as audio and/or video, from one component to another. That is, the control box may accept data from one component and transfer it for output on another component. This may be facilitated through the use of localized control boxes that may act to route data to all devices connected thereto. These local control boxes may also accept commands from a remote control and implement those commands to control attached components, or may relay the commands to the centralized control box. Essentially, each local control box may be connected to a central control box; the central control box may coordinate and relay data between local control boxes and, thus, between components connected to local control boxes. The central control box may also act to relay commands from a remote between local control boxes and/or associated components.

The terms "electronic component" and "component" are used interchangeably herein. Both terms refer to a device that is configured to perform certain functionality in response to the receipt of a command; the command may be inputted into the component directly, through a remote control or via a network connection. Accordingly, devices such as televisions, television receivers, audio equipment, appropriately-configured household appliances and fixtures, and so on may all be considered components. Further, the control boxes themselves may be components.

This document also refers to "state information." As used herein, "state information" discloses the operating state and status of a component. State information may include power status, current output, current input, active processing routine (such as an audio and/or video format of an output), battery life remaining, and so on.

It should be noted that this document discusses functionality of embodiments with respect to "television receivers." A television receiver, as described herein, is intended to encompass other forms of signal receiving components, such as set-top boxes, cable boxes, tuning circuitry within a television or receiver, and so on. Accordingly, the term "television receiver" is one of convenience and not limitation. Likewise, references to a satellite transmission system may be replaced with cable transmission systems, over the air (terrestrial) broadcasts, data transmissions across a wired or wireless network, including networks such as the Internet, intranets, and so on, without departing from the spirit or scope of this disclosure. Thus, one should understand the embodiments encompass the use of any of the foregoing networks in lieu of the satellite network used to illustrate certain embodiments herein.

Figure 1:
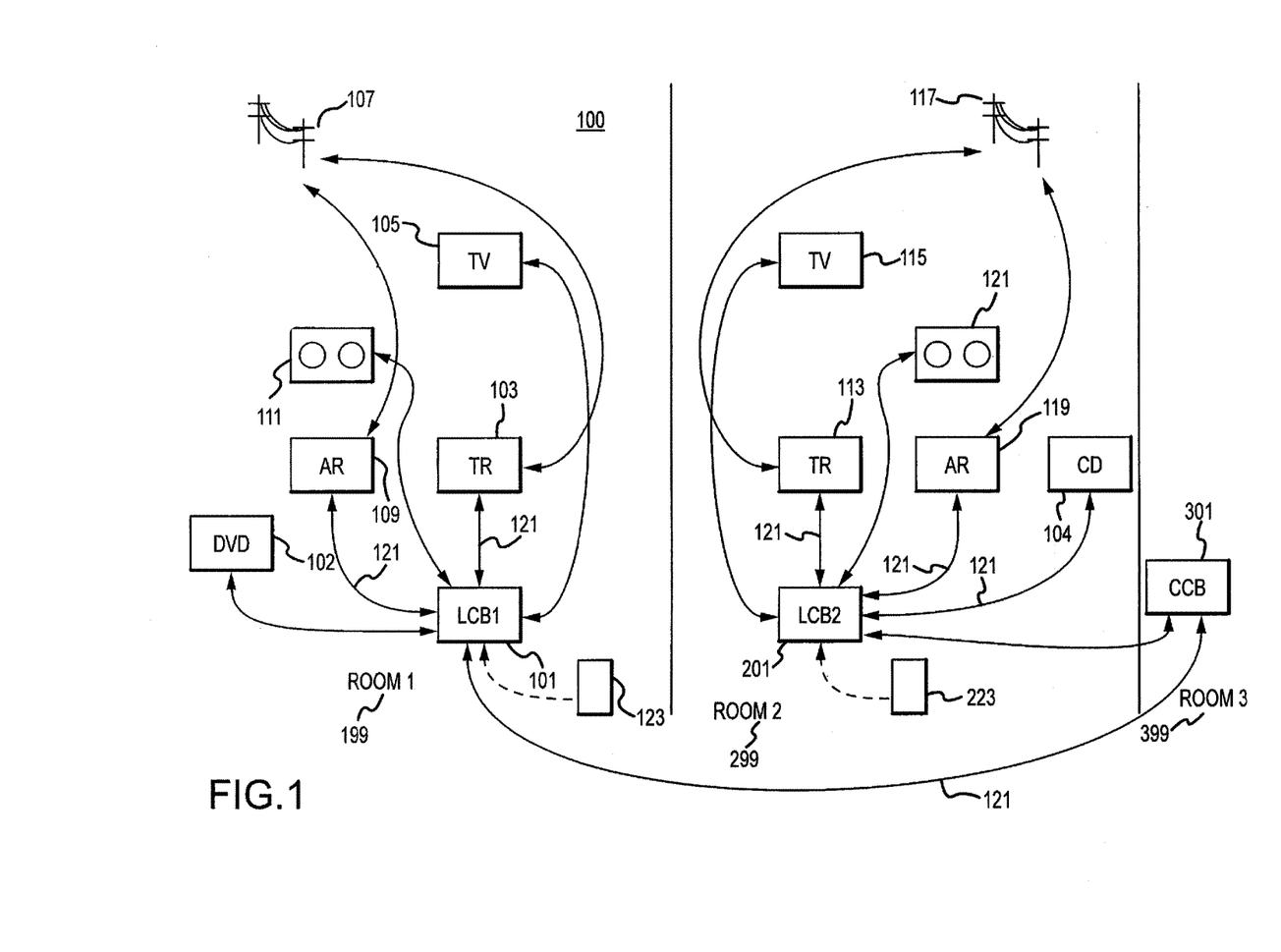
FIG. 1 depicts a sample operating environment for a centralized control unit.

FIG. 1 depicts a sample environment 100 in which a user may employ a sample centralized control unit. Various components may be located in the environment 100 of FIG. 1, such as, but not limited to, one or more televisions 105, 115, one or more television receivers 103, 113, one or more audio receivers 109, 119, one or more media devices, including a digital video disc ("DVD") player 102 and/or a compact disc ("CD") player 104, one or more speakers 111, 121, one or more local control boxes 101, 201, 301, and one or more remote control devices 123, 223. The various components may be in the same room, or, as shown in FIG. 1, may be in different rooms and/or on different floors, different physical locations or any combination thereof.

In this example, the environment 100 includes three rooms 199, 299, and 399. Some rooms 199, 299 may include at least one local control box 101, 201. For example, one room 199 may include a first local control box 101 that is connected to a first set of components, while a second room 299 may include a second local control box 201 that is connected to a second set of components. In addition, a third room 399 may include a centralized control box 301 that is connected to the first and second local control boxes 101, 201. The components connected to the first and second control boxes 101, 201 may vary and be any of those previously discussed.

Additionally, the local control boxes 101, 201 may communicate with one or more remotes 123, 223. In one embodiment, the remotes 123, 223 may also be associated with all or some of the components connected to the local control boxes 101, 201, such as the television receivers 103, 113, audio receivers 109, 119, DVD player 102, CD player 104 and/or televisions 105, 115 connected to the local control boxes 101, 201. As such, the remotes 123, 223 may be configured to transmit control commands to both the local control boxes 101, 201 and to some or all of the components connected to the local control boxes 101, 201.

Commands may be transmitted to components either directly or via the local control boxes 101, 201. For example, each remote 123, 223 may be associated with a single local control box 101, 201 and the components directly connected to the local control box 101, 201. The remotes 123, 223 may identify their associated local control box 101, 201 by a unique identifier, such as a serial number, and interface with the components through each local control box 101, 201. In another embodiment, the same remote may be associated with both local control boxes 101, 201, so that a user may control both boxes 101, 201 and any components connected to the boxes 101, 201 using a single remote. In a further embodiment, the remotes 123, 223 may further be associated with other electronic components that reside in the environment 100 but may not be connected to either of the local control boxes 101, 201.

The remotes 123, 223 may take other forms than a standard remote control, such as a cell phone, track pad incorporated into a computing system, and so on. The remotes 123, 223 may include buttons, dials, or other interfaces for inputting commands. In response to such commands, the remotes may transmit signals to the local control boxes 101, 201 and/or any component configured to receive such commands. The remotes 123, 223 may communicate with the local control boxes 101, 201 and with the other components in the environment 100 through any suitable means, such as an IR signal, RF signal, wireless Internet Protocol ("IP") connection, cellular signal, WiMax signal, combinations thereof, and so on.

Additionally, the remotes 123, 223 need not be in the line of sight of a local control box 101, 201 and may be anywhere that permits communication with the local control boxes 101, 201, such as in another room or on another floor. Similarly, each remote may also send signals to other components in the environment 100 that are located in the same room as the remote such as a television, a stereo, a VCR, a DVD player and so on, or in another room or on another floor.

The local control boxes 101, 201 may communicate with one another across any appropriately configured network 121, whether wired or wireless. Further, a central control box 301 may be connected to one or both of the local control boxes 101, 201 by the network. As shown in FIG. 1, the central control box 301 may be located in a separate room from the local control boxes. However, in other embodiments, the central control box 301 may be located in the same room as either or both of the local control boxes 101, 201.

As previously mentioned, television receivers 103, 113 may be connected to their respective local control boxes 101, 201. The television receivers 103, 113 may receive television signals from a content provider 107, such as a cable television provider, a broadcast television provider, a satellite television provider and so on. Each television receiver 103, 113 may process these television signals and may send the processed signals to one or more components. The television receivers 103, 113 may also accept control commands from the remotes 123, 223, either directly or through an associated local control box 101, 201.

As shown in FIG. 1, the television receivers 103, 113 may be located in different rooms. In addition, each television receiver 103, 113 may be connected to one or more cable television providers, antennas for receiving broadcast signals from a broadcast television provider, satellite communication components, and one or more other components, such as one or more televisions 105, 115 and/or one or more audio receivers 109, 119. As discussed above, each television receiver 103, 113 may further be wirelessly or physically connected to a local control box 101, 201 in the environment 100, such as through a network 121.

In addition, multiple televisions 105, 115 may be located in the environment 100. As shown in FIG. 1, the televisions 105, 115 may all be located in multiple rooms, or alternatively, in one room. Each television 105, 115 may be connected to a respective local control box 101, 201, which may be located in the same room or alternatively, may be anywhere that permits communication with the local control box 101, 201, such as in a different room. Alternatively or in addition, the televisions 105, 115 may be connected to one or more television receivers 103, 113 that may be located in the same room or in a different room. In alternative embodiments, a single local control box 101, 201 may be connected to multiple televisions 105, 115.

One or more audio receivers 109, 119 may also be located in the environment 100. As shown in FIG. 1, the audio receivers 109, 119 may be located in different rooms. As discussed above, each audio receiver 109, 119 may be wirelessly or physically connected to a local control box 101, 201 in the environment 100, such as through a network 121. The audio receivers 109, 119 may also accept control commands from the remotes 123, 223, either directly, or through an associated local control box 101, 201.

Other components located in the environment 100 may also be connected to one or multiple local control boxes 101, 201. For example, a DVD player 102, CD player 104, and/or speakers 111 121 may each be connected to a respective local control box 101, 201, which may be located in the same room or alternatively, may be anywhere that permits communication with the local control box 101, 201. Alternatively or in addition, these components may be connected to one or more audio receivers 109, 119 that may be located in the same room or in a different room.

The components located in the environment 100 of FIG. 1 are provided for explanatory purposes only. Further, a computing system (not shown) may be located in the environment 100. The computing system may be in the same room or may be in a different room than the local control boxes 101, 201 and may communicate with the local control boxes 101, 201 through a network.

In FIG. 1, the local control boxes 101, 201 may be operationally, directly, indirectly, functionally or otherwise connected to the television receivers 103, 113, televisions 105, 115, audio receivers 109, 119, speakers 111, 121, DVD player 102, and/or CD player 104. Communications between the local control boxes 101, 201 and these components may be unidirectional or bi-directional, and may be provided through various interfaces such as a high definition multimedia interface ("HDMI") cable, a co-axial cable, structured cable, Ethernet, wireless interface, combinations thereof and so on.

In one example, the local control boxes 101, 201 may receive and store state information from some or all of the components connected to the local control boxes 101, 201. The state information, which will be discussed in further detail below, may include whether the component is on, off, busy, or idle. The state information for each component connected to the local control boxes 101, 201 may be passed from the components to the local control boxes 101, 201 through a back-channel, or through any two-way communication link, including a Q-link, Viera cast, or through a High-Definition Multimedia Interface ("HDMI").

The local control boxes 101, 201 may control the components of environment 100 wirelessly, through a wired connection, or through a combination thereof. The local control boxes 101, 201 may also control the components resident in the environment 100 through remotes 123, 223, which will be discussed in further detail below. For example in FIG. 1, the local control boxes 101, 201 may communicate with the televisions 105, 115, audio receivers 109, 119, television receivers 103, 113, DVD player 102, and CD player 104 based on control commands transmitted by the remotes 123, 223. The local control boxes 101, 201 may communicate with any of the connected components and the remotes 123, 223 through any type of interface as previously discussed. Such communication may be wired or wireless, across a network, or local. Furthermore, the communication between the local control boxes 101, 201 and the remotes 123, 223 is generally wireless, although it may be possible to communicate between the local control boxes 101, 201 and the remote 123, 124 by establishing a wired connection between the two components. Moreover, it may be possible for the local control boxes 101, 201 to communicate with the connected components and the remotes 123, 223 through any combination of wired and wireless connections.

The remotes 123, 223 may include selection buttons that correspond to and directly control the local control boxes 101, 201, as well as buttons that control some or all of the individual components. For example, the remotes 123, 223 may include multiple selection buttons, including channel selection buttons, power on/off buttons, volume control buttons, etc.

The centralized control box 301 may be operationally, directly, indirectly, functionally or otherwise connected to the local control boxes 101, 201. Communications between the central control box 301 and the local control boxes 101, 201 may be unidirectional or bi-directional, and may be provided through the various interfaces described above. In one example, the local control boxes 101, 201 may transmit the state information regarding some or all of the components to the central control box 301 so that the central control box 301 may process and store the state information. The state information may be passed from the local control boxes 101, 201 to the central control box 301 through a back-channel, or through any two-way communication link, including a Q-link, Viera cast, or HDMI.

The television receivers 103, 113 may be operationally, directly, indirectly, functionally or otherwise connected to the televisions 105, 115. Communications between the televisions 105, 115 and the television receivers 103, 113 may be unidirectional or bi-directional, where bi-directional communications are provided by the television display, and may be provided through various interfaces such as a high definition multimedia interface ("HDMI") cable, a co-axial cable, structured cable, Ethernet, wireless interface, combinations thereof and so on.

The audio receivers 109, 119 may be operationally, directly, indirectly, functionally or otherwise connected to the television receivers 103, 113, speakers 111, and any other input or output components, such as a DVD player 102 and CD player 104. Communications between the audio receivers 109, 119 and these components may be unidirectional or bi-directional, and may be provided through various interfaces, as described above with respect to the connection between the television receivers 103, 113 and the televisions 105, 115.

Figure 2:
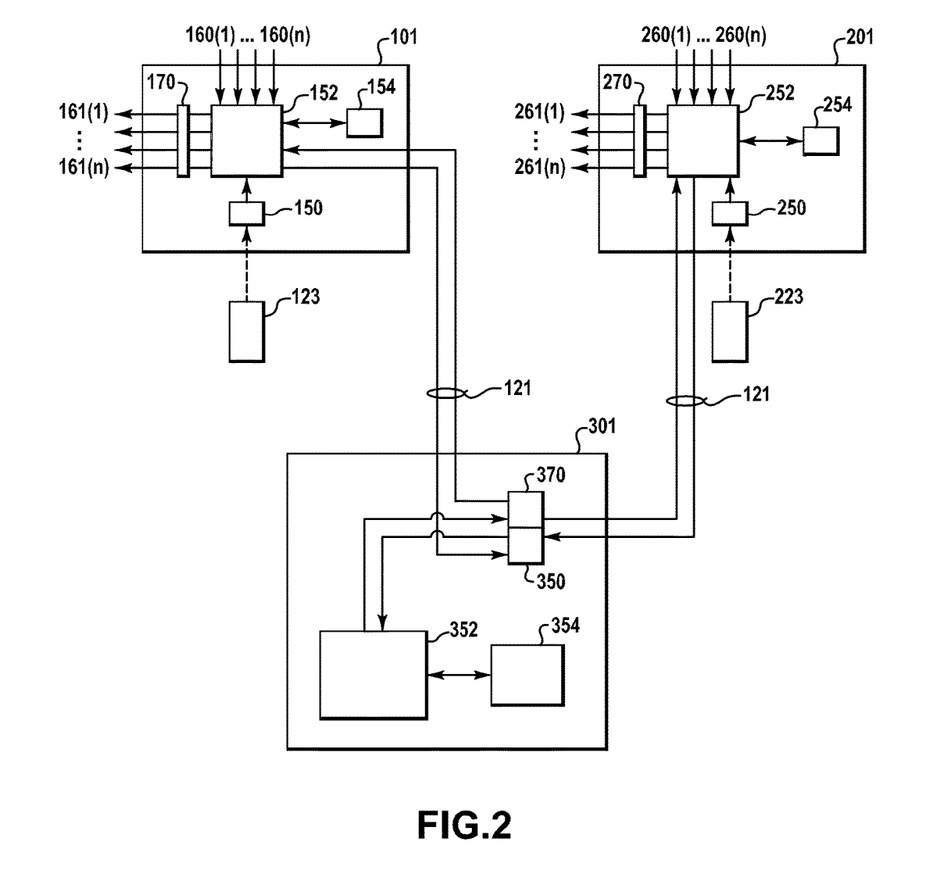
FIG. 2 is a schematic representation of control boxes that may be employed in the sample operating environment illustrated in FIG. 1.

A schematic representation of a control box system is illustrated in FIG. 2. As shown in FIG. 2, each local control box 101, 201 may include multiple inputs 160(1)-160(n), 260(1)-260(n), multiple outputs 161(1)-161(n), 261(1)-261(n), a receiver 150, 250 for receiving and decoding commands received from the remotes 123, 223, a transmitter 170, 270 for transmitting commands to components connected to the local control boxes 101, 201, a processor 152, 252 and a memory device 154, 254. FIG. 2 depicts the local control boxes 101, 201 as having separate inputs and outputs for explanatory purposes only. In some embodiments, there may be more or fewer inputs than shown, and/or inputs may be combined with outputs (as in the case of a transceiver, for example). As discussed above, the connection between each component and the local control boxes 101, 201 may be a two-way connection link, rather than separate input and output ports.

The inputs 160(1)-160(n), 260(1)-260(n) of the local control boxes 101, 201 may be configured to receive state information from the connected components. The state information may include data indicating whether a device is on, off, busy (or in use), or idle. In addition, as will be discussed further below, the inputs 160(1)-160(n), 260(1)-260(n) may be configured to receive a data signal that may include audio and/or video data from the components connected to the local control boxes 101, 201.

The outputs 161(1)-161(n), 261(1)-261(n) of the local control boxes 101, 201 may be configured to transmit control commands from the local control boxes 101, 201 to the connected components. As an example, the control commands may include commands to turn on or shut off a connected component, adjust volume, change channels, etc. Additionally, the outputs 161(1)-161(n), 261(1)-261(n) may also be configured to transmit audio and/or video data from the local control boxes 101, 201 to the connected components.

The processors 152, 252 of the local control boxes 101, 201 may be configured to transmit control commands to one or more of the components connected to the local control boxes, and may further be configured to process state information received by the local control boxes from the components. In some embodiments, the audio and/or video data from the local control boxes 101, 201 and/or the control commands may be transmitted via a transmitter 170, 270. In one embodiment, the state information may be locally stored on the memory or storage devices 154, 254 of the local control boxes 101, 201. The storage devices 154, 254 may be volatile memory, such as static RAM or dynamic RAM, or non-volatile memory, such as read-only memory, flash memory, or a magnetic computer storage device (e.g. hard disks, floppy discs, etc.).

The processors 152, 252 of the local control boxes 101, 201 may further be configured to process the control commands transmitted by the remote control devices 123, 223. The control commands may include any variety of commands, including on, off, and volume and channel changing commands corresponding to any of the individually connected components. Further, the control commands may include commands directed to all of the components connected to the local control boxes 101, 201.

The central control box 301 may utilize a two-way communication link 121 to communicate with each of the local control boxes 101, 201, and may include a processor 352, a memory device 354, a receiver 350 configured to receive input commands, and one or more transmitters 370. The input commands may be initiated by a user, for example, through a remote control, one of the local control boxes 101, 201, or direct input into the central control box. Each two-way communication link 121 may be configured to transmit state information received by the local control boxes 101, 201 to the central control box 301, and may further be configured to transmit the video and audio data signals received by the local control boxes 101, 201 from the components, such as via a transmitter 370. Additionally, the transmitters 370 may be configured to transmit control commands from the central control box 301 to the local control boxes 101, 201, as well as video and/or audio data signals.

In one embodiment, the processor 352 of the central control box 301 may facilitate routing or streaming data, including audio and/or video data, between the local control boxes 101, 201. Accordingly, the central control box 301, in conjunction with the local control boxes 101, 201, may be configured to stream audio or video data from a component that is connected to one of the local control boxes 101, 201 to any other component that is connected to the local control boxes. Referring to the embodiment shown in FIG. 1 as an example, a video signal received from the television receiver 103 located in the first room 199 may be transmitted to the television 115 in the second room 299, even though the receiver and television are not directly connected to one another. The embodiment may route data to the local control box 101 connected to the television receiver 103, from the local control box 101 to the central control box 301, from the central control box 301 to the local control box 201 connected to the television 115 and ultimately to the television. As another example, an audio signal received from the CD player 104 in the second room 299 may be played by speakers 111 in the first room 199 by routing the signal from the CD player 104 to the local control box 201, then to the central control box 301, from the central control box 301 to the local control box 101, and ultimately to the speakers 111. One example of a method for routing data signals between two components in an environment using a control box is discussed in detail with respect to FIG. 4.

Figure 5:
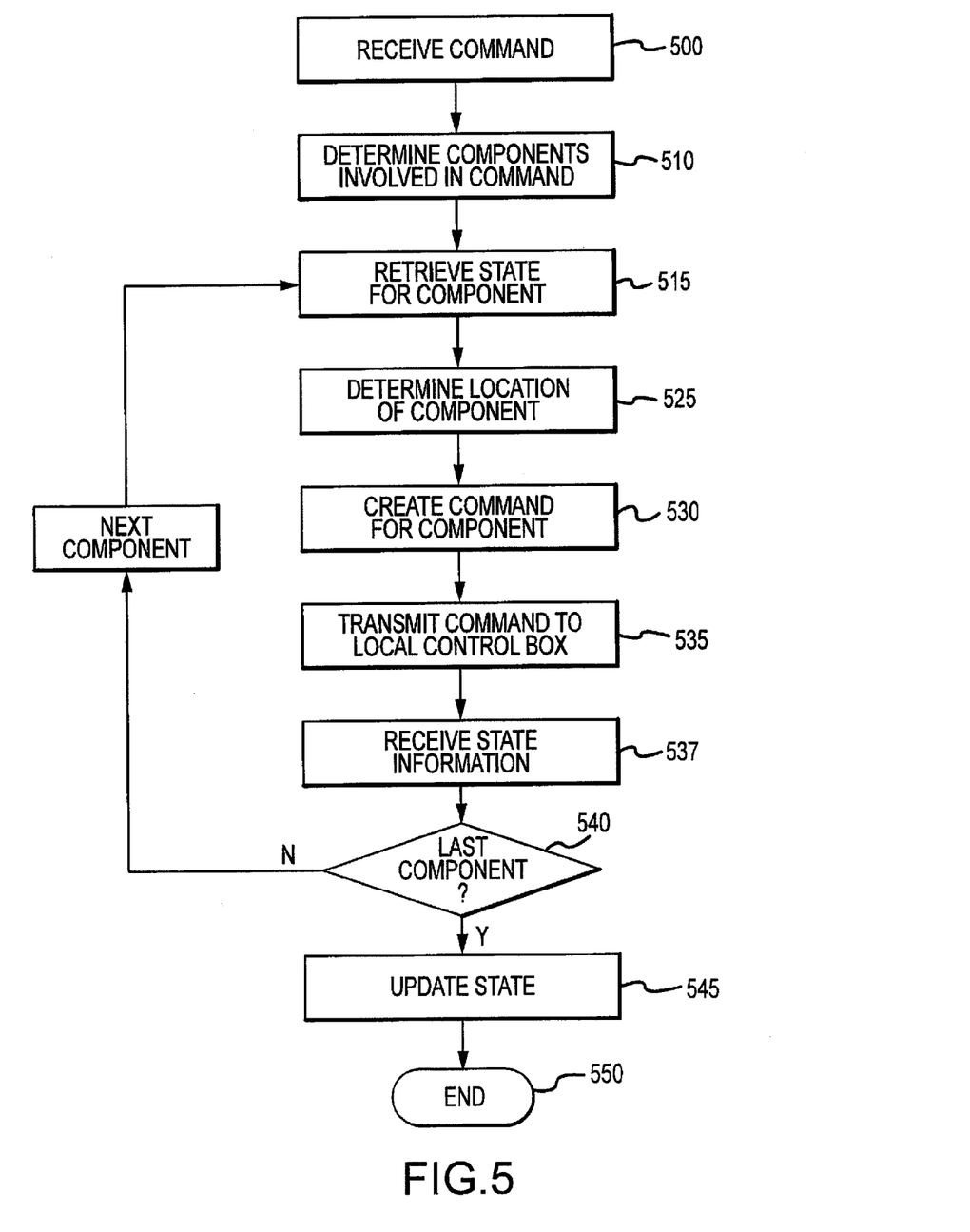
FIG. 5 is a flowchart illustrating an example of a method for processing a command at a central control box.

Returning to FIG. 2, the processor 352 of the central control box 301 may further be configured to process the control commands transmitted by the remote control devices 123, 223 and relay them to the appropriate components. The control commands may include any variety of commands, including power, volume, channel change, active processing commands, and so on, corresponding to any of the individual connected components. Additionally, the control commands may include commands directed to a group of components (such as the groups of components connected to the local control boxes 101, 201). In one embodiment, each remote control 123, 223 may include a "SYSTEM POWER ON" or "SYSTEM POWER OFF" button that allows a user to turn off or turn on all of the components connected to the local control boxes 101, 201 and/or all components connected to the central control box 301. Turning off the components connected to the local control boxes 101, 201 may include completely powering off the components, which may save a significant amount of power over when the components are in a standby or idle mode. FIG. 5 provides an example of the interaction between a remote, the central control box and a component and is discussed below. Similarly, the central control box 301 and/or local control boxes 101, 201 may be programmed to turn off or turn on all or some of the connected components at a particular time selected by the user. For example, the user may program the central control box 301 to turn off all of the components when the user typically goes to sleep or goes to work to avoid wasting power when the user does not intend to operate any of the components. In some embodiments, components may be plugged into the local control boxes 101, 201, or otherwise use the local control boxes as a power source. In such an embodiment, the local control box may cease providing power to the components when a power-off command is received. This may generate power savings, insofar as certain components enter a "standby" mode or otherwise continue to draw some power even when placed in an off state.

Additionally, the processor 152 of the central control box 301 may be connected to a storage device 354. The storage device 354 may be volatile memory, such as static RAM or dynamic RAM, or non-volatile memory, such as read-only memory, flash memory, or a magnetic computer storage device (e.g. hard disks, floppy discs, etc.). The storage device 154 may be configured to store state information relating to the components connected to the local control boxes 101, 201. The state information may be stored in any manner of formats known to those in the art, including as a table.

Figure 3:
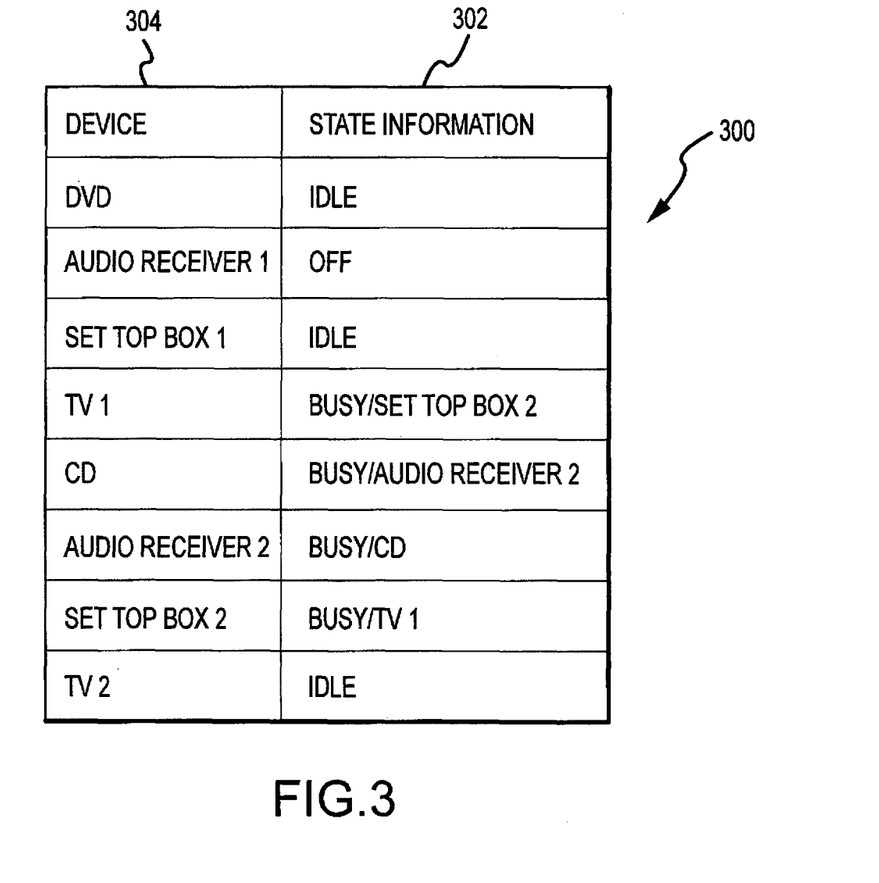
FIG. 3 is an example of a table that may be employed by the embodiments described herein.

One example of a table that may be employed by the control boxes described herein is illustrated in FIG. 3. The table may include a list 300 of components that are connected to the local control boxes 101, 201. Each entry on the list may include a component entry 304 and state information 302 for that component. Each component may be denoted by a suitable unique identifier. The exact identifier may vary between embodiments but may include a generic name for the component, a numerical identifier, a brand name of the component, a component serial and/or model number, or any other identifier that may allow the user to identify the associated component. As appropriate, the table 300 may be periodically updated or may be updated only when a change in state of a component occurs so that the state information for each component is current.

As mentioned above, the stored state information 302 may include whether a connected component is on or off, disconnected, whether the component is currently in use, an operating state of the component, whether the component is in an idle state, and so forth. In this example, the table 300 in FIG. 3 indicates that a DVD player, television receiver, and television are all in an idle state, and that an audio receiver is off. State information may be received by the central control box 301 from a local control box 101, 201 connected to the component or, in some cases, may be received directly by the central control box.

Additionally, the state information shown on the table 300 may include information regarding the input signals currently being transmitted to a particular component. The specificity of the information may vary according to different embodiments of the present disclosure. For example, the table 300 shown in FIG. 3 indicates that the television 1 is currently receiving an input signal from the television receiver 2, and that the audio-receiver 2 is currently receiving an input signal from the CD player. As shown in FIG. 3, the table 300 may further include information regarding the output signals being transmitted by a particular component. For example, the table 300 may indicate that the video signal from the television receiver 2 is being transmitted to the television 1, and that the audio signal from the CD player is being transmitted to the audio receiver 2.

Other embodiments may employ a simplified version of the table 300 illustrated in FIG. 3. For example, the state information may be limited to idle, busy, on, off, and/or disconnected states, while omitting any information relating to the input signals received by a component or the output signals transmitted by a component. Additionally, some embodiments may be more detailed than the information provided by the table 300 in FIG. 3. For example, the table may indicate which channel a particular television receiver is currently tuned to, including program information, which radio station a particular audio receiver is currently tuned to, including any associated program information, the CD or song being player by the CD player, the movie being played by a DVD player, and so on.

In one embodiment, all of the possible states for each component connected to the local control boxes may be stored in a database 301 at the storage device 354 of the central control box and/or at the storage devices 154, 254 of the local control boxes 101, 201. The states for each device may be stored, for example, in an associative array or as a lookup table.

The central control box 301, in conjunction with the local control boxes 101, 201, may further be programmed to automatically turn on or turn off components based on state information. In one embodiment, the central control box 301 may receive state information from the components connected to the local control boxes 101, 201 and turn off the components if all or some of the components are turned on and in an idle state for a predetermined period of time. The period of time that elapses before the control box 301 turns off the components may vary, and may be preprogrammed by the user. Thus, as an example, if a user finishes watching television and forgets to turn off the television receiver associated with the television, the central control box 301 may determine that the television receiver is in an idle state and turn it off after a preset period of time.

In some embodiments, a user may access the information in the table 300. The information may be presented to the user via any display device that is connected to the local control boxes 101, 201, or on a display screen located on the local control boxes 101, 201 or on the central control box 301. For example, with respect to the embodiment shown in FIG. 1, the information may be displayed on one of the televisions 105, 115 connected to the local control boxes 101, 201. In other embodiments, the information may be displayed on another display device connected to the control boxes 101, 201, 301, such as a computer monitor or on a remote control device that includes a display screen. In yet another embodiment, when the user initiates a command for a particular component, the central control box 301 may transmit state information for that component to a display in the room occupied by the user. Since the central control box in aware of the user's room (insofar as the command is received from a particular local control box 101, 201 in a particular room), the central control box may output the state information to the appropriate local control box and, ultimately, to a display in that room.

In other embodiments, only some of the information from the table 300 may be presented to the user. For example, the control boxes 101, 201, 301 may only notify the user that a particular component is busy if the user selects that component. Further, the control boxes 101, 201, 301 may omit information relating to the input signals received by a component or the output signals transmitted by a component. Additionally, the control boxes 101, 201, 301 may not be configured to relay state information for display, but may be configured to emit sounds signifying that a particular component is in use, disconnected, or otherwise unavailable.

Figure 4:
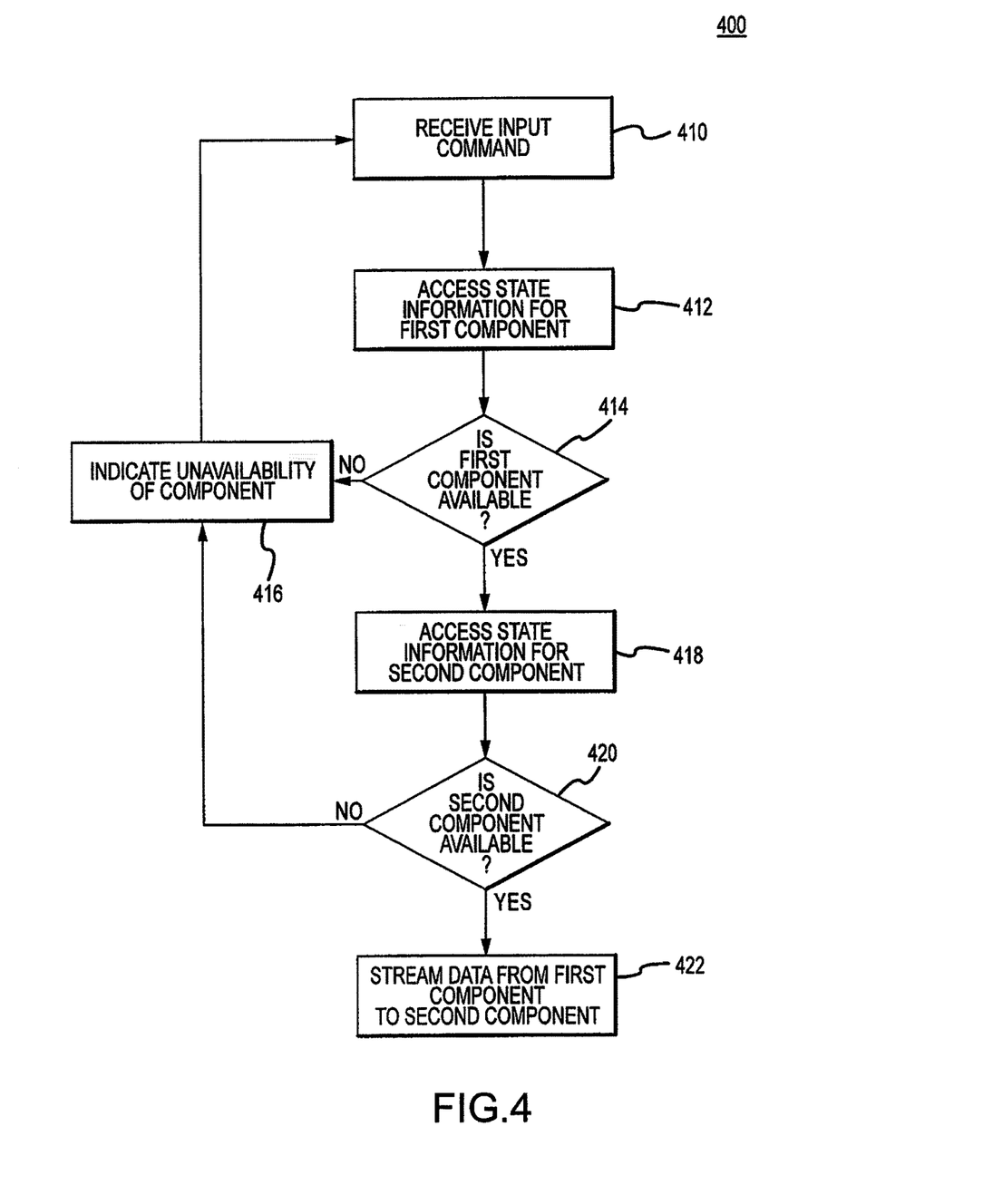
FIG. 4 is a flowchart illustrating an example of a method for transmitting a data signal between multiple components.

FIG. 4 is a flowchart depicting operations of an embodiment of a method 400 for routing data signals between components. The method shown in FIG. 4 may be executed by one or more local control boxes, a central control box or a combination thereof.

In the operation of block 410, a control box may receive an input command from a remote. For example, the input command may be initiated a user and may identify both a source and destination component. In the operation of block 412, the control box may access the state information for the first component. The state information may be stored in a memory at the control box in a table, as described above, and may include on, off, disconnected, busy and/or idle states. The state information may be received via inputs to the control box, such as through a two-way communication link between the control box and the component. The link may be a Q-link, HDMI connection, a back-channel, a network as discussed with respect to FIG. 1, and so forth. In some embodiments, a local control box may monitor the state information for components attached thereto and relay this information to the central control box. In yet other embodiments, the central control box may set the state information for a component based on a received command. Thus, if the control box receives a command to turn off a component, it may update the table to indicate the component is off.

In the operation of block 414, the control box may determine whether the first component is available based on the information stored in the table. For example, the control box may access the table to determine whether the first component is currently in use, idle, off, or disconnected. Continuing the example, the table may indicate that the first component is in an unavailable state if the first component is disconnected, inaccessible or currently streaming data to another component. If the component is unavailable, then in operation 416, the control box may indicate that the first component is unavailable. As discussed above, this may be accomplished by displaying the state information of the first component to the user via a display device, or indicating the unavailability of the first component using a sound.

If, in the operation of block 414, the control box determines that the first component is available (for example, if the table indicates that the first component is available) then in operation 418, the control box will access the state information for the second component. In one embodiment, if the table indicates that the first component is off, then the control box may transmit a control command to turn on the first component, and accordingly, update the status of the component to an "idle" or available state.

In the operation of block 420, the control box may determine whether the second component is available based on the information stored in the table. The procedures for obtaining the status of the second component are similar to those described above with respect to the first component in operation 414. If, in the operation of block 420, the table indicates that the first component is in an unavailable state, then, in operation 416, the control box may indicate that the second component is unavailable. As discussed above, this may be accomplished by displaying the state information of the first component to the user via a display device, or indicating the unavailability of the first component using a sound.

If, in the operation of block 420, the control box determines that the second component is available, then, in operation 422, the control box will stream data from the first component to the second component. As discussed above, this may be accomplished using a processing device in the central control box, which may act as a network switch to route the data signal output by the first component to an input of the second component. The signal may be an audio and/or video signal, depending on the type of signal that is output by the first component.

FIG. 5 is a flowchart depicting a method for processing a command at a central control box. The command may be initiated by a user through, for example, a remote control or direct input into a local control box (if applicable).

In the operation of block 500, a control box may receive an input command. For example, the input command may be initiated a user and may identify both a source and a destination component, or multiple source and/or destination components. In the operation of block 510, the control box may determine the components involved in the command. For example, the control box may determine all of the source and destination components that that will transmit or receive data signals. In one embodiment, a list or a table of all of the components connected to the central control box and/or to local control boxes connected to the central control box may be stored in a memory of the central control box of the local control boxes, and the source and destination components may be determined from the list. The list 300 shown in FIG. 3 may be used for this purpose.

After determining the components involved in the command, in the operation of block 515, the control box may retrieve state information for some or all of the components involved in the command. Continuing the example, the table may indicate that the component is in an unavailable state if the first component is disconnected, inaccessible or currently streaming data to another component. The state information may be received via inputs to the central control box, such as through a two-way communication link between the local control box connected to the component and the central control box. In other embodiments, a local control box may monitor the state information for components attached thereto and relay this information to the central control box. In yet other embodiments, the central control box may set the state information for a component based on a received command.

In the operation of block 525, the central control box may determine the location of the components identified by the input command. In one embodiment, the central control box may determine the location of the components with respect to a local control box that is directly or indirectly connected to some or all of the components. For example, the local control boxes may transmit information identifying the components that are connected to each of the local control boxes to the central control box, and the central control box may store this information in memory. In another embodiment, the central control box may be directly or indirectly connected to some or all of the components, and the central control box may thus maintain location information from the components.

In the operation of block 530, the central control box may create a command that will be transmitted to the component. The command may include, for example, a command to transmit an audio or data signal from the source component to the destination component, or a command to turn on or turn off the component. In one embodiment, this operation may include reformatting the command received in operation 500 with any appropriate IR or RF signals for the component.

In the operation of block 535, the central control box may transmit the command to the local control box connected to the component (if such a local control box exists). In one example, the command will be relayed through the local control box and instruct the component to stream data to a destination component or to turn on. As discussed above, the data from the component may be transmitted by the local control box to the central control box, which may route the data signal output by the first component to the local control boxes connected with the destination components. The signal may be an audio and/or video signal, depending on the type of signal that is output by the first component.

In operation 537, the control box may receive state information regarding the component. The state information may be transmitted from the local control box connected to the component to the central control box. In another embodiment, the state information may be transmitted directly from the component to the central control box.

In operation 540, the control box may determine whether the component being controlled is the last component identified in the input command. For example, if the input command designates two components, such as a source component and a destination component, the last component may be the destination component. In another example, if the input command designates a source component and two or more destination components, the control box will recognize a component as the "last" component when it has received state information from all of the other components designated by the input command.

If, in operation 540, the control box determines that the component being controlled is not the last designated component, then block 555 is executed and the control box will retrieve state information regarding the next component designated in the input command in the operation of block 515. After block 555, the embodiment executes blocks 515-537 for this next component. However, if the control box determines that the component being controlled is the last designated component in block 540, then, operation 545 is executed and the control box may update the state of the components designated in the input command. For example, the last component may be a destination component that is now receiving a data signal from a source component, and the control box may update the states of the destination and source components to indicate the unavailability of these components.

Once the states of the destination and source components have been updated, the method may continue to block 550, where the process may end.

Although the embodiments have been described with respect to particular apparatuses, configurations, components, systems and methods of operation, it will be appreciated that certain changes or modifications to the embodiments and/or their operations, as described herein, may be made without departing from the spirit or scope of the invention. Accordingly, the proper scope of the invention is defined by the appended claims. The various embodiments, operations, components and configurations disclosed herein are generally provided as examples rather than limiting in scope.

The invention claimed is:

1. A control system comprising:
one or more remote control devices;
a first local control box coupled to one of the remote control devices, a source component, and a first destination component the first local control box having a first processor configured to determine state information of the source component and the first destination component, a first memory that stores the state information of the source component and the first destination component, and a first receiver, the first local control box configured to stream multimedia data;
the first processer configured to access the first memory to determine if the state information of the first destination component indicates that the first destination component is currently available or unavailable, wherein unavailable includes being in use, off, or disconnected;
a second local control box coupled to one of the remote control devices and a second destination component, the second local control box having a second processor configured to determine state information of the second destination component, a second memory that stores the state information of the second destination component, and a second receiver, the second local control box configured to stream multimedia data; and
a central control box coupled to the first and second local control boxes, the central control box having a central processor and a central memory, the central control box configured to:
  receive a command from a user, via the first local control box, identifying the source and the first and second destination components and requesting a transfer of data from the source component to the first and second destination components;
  retrieve state information of the source component and the first destination component from the first memory;
  when the state information indicates availability of the source component and availability of the first destination component, then stream multimedia data from the source component to the first destination component;
  if the state information indicates that the first destination component is off, then the central control box transmits a signal to the first destination component to turn on the first destination component and updates the state information of the first destination component to available, then stream multimedia data from the source component to the first destination component;
  if the central control box indicates that the state information of the first destination component is available, then retrieve state information of the second destination component from the second memory;
  when the state information indicates availability of the second destination component, then stream the multimedia data from the first destination component to the second destination component.

2. The system of claim 1, wherein when the state information of the second destination component indicates unavailability of the second destination component the central processor is further configured to inform the first local control box that the second destination component is unavailable.

3. The system of claim 1, wherein the central processor is further configured, upon transmitting data to the first destination component, to update the state information of the first destination component to indicate that the destination component is busy.

4. The system of claim 1 wherein the source component is a set top box and the first and second destination components are each a television.

5. The system of claim 1, wherein the state information of the first and second destination component includes at least one of a power state and an operating state of the respective first and second destination component.

6. The system of claim 5, wherein the state information of the second destination component is determined through a high definition multimedia interface.

7. The system of claim 1 wherein the second local control box is further configured to transmit the state information of the second destination component to the central control box.

8. The system of claim 1 wherein the transfer of data is a transfer of multimedia data including audio and video data stored on a media device or in an electronic memory.

9. The system of claim 1 wherein the transfer of data is a transfer of a multimedia data stream including audio and video data.

10. The system of claim 1 wherein the source component is one of a set top box, a computer, or a mobile computing device and the second destination component is one of a television, a computer display screen, a mobile computing device, or a household appliance with a display screen.

11. The system of claim 1 wherein the transfer data includes relaying remote control commands so as to permit any one, or all, of the control boxes and components, distributed among separate rooms, to be under control of the same remote control device.

12. The system of claim 1 wherein the second destination component has substantially the same function as the first destination component.

13. A method for streaming multimedia data from a source component to one of a first or second destination component, the method comprising:
   receiving, at a first local control box, an input command from a remote control device;
   identifying the source component and the first and second destination components;
   instructing via the input command a transfer of multimedia data from the source component to the first destination component;
   determining, by the first local control box, state information of the source component and the first destination component, the state information including being available or unavailable, wherein being unavailable includes being in use, off, or disconnected;
   streaming multimedia data from the source component to the first destination component, when the state information indicates availability of the source component and availability of the first destination component,
   if the state information indicates that the first destination component is off, transmitting a signal, via a central control box, to the first destination component to turn on the first destination component, and then streaming the multimedia data from the source component to the first destination component;
   retrieving, at the central control box, a state information of the second destination component from a memory location;
   streaming, by the central control box, the multimedia data stream from the first destination component to the second destination component, if the state information of the second destination component indicates it is available.

14. The method as claimed in claim 13, wherein the state information of the second destination component indicates that the second destination component is unavailable if the second destination component is receiving multimedia data from a third component is not connected to a second local control box.

15. The method as claimed in claim 13, further comprising
   storing, by the central control box, the state information of the second destination component in a storage device; and
   updating, by the central control box, the stored state information of the second destination component once the multimedia data has been streamed to the second destination component.

16. The method of claim 13, further comprising:
   receiving, at the central control box, the state information of the second destination component from a second local control box; and
   the second local control box configured to determine the state information of the second destination component through a high definition multimedia interface connection.

17. A system for routing a data signal between a plurality of components, comprising:
   a first control box coupled to a source component and a first destination component, the first control box configured to determine a state information of the source component and the first destination component, save the state information, and receive a first data signal from the source component when the state information indicates availability of the source component;
   a second control box operably connected to the first control box and to a third control box; and
   the third control box operably coupled to a destination component;
   wherein the first control box is further configured to receive a command from a remote control, the command requesting a transfer of the first data signal from the source component to the first and second destination components;
   the first control box retrieving state information of the source component and the first destination component;
   the first data signal being streamed from the source component to the first destination component, when the state information indicates availability of the source component and availability of the first destination component;
   if the state information indicates that the first destination component is off, then the first control box transmits a signal to the first destination component to turn on the first destination component and stream the first data signal from the source component to the first destination component;
   the second control box is configured to:
      retrieve a state information of the second destination component from a memory location, if the second control box indicates that the state information of the first destination component is available; and relay the first data signal from the first destination component to the second destination component, only when the retrieved state information indicates availability of the second destination component;

the third control box is configured to determine the state information of the second destination component, and at least one of the first, second, and third control box is configured to receive and store state information of the first and second destination components.

18. The system of claim 17, wherein the third control box determines the state information of the second destination component through a high definition multimedia interface.

\* \* \* \* \*